United States Patent [19]
Gordon

[11] Patent Number: 5,567,098
[45] Date of Patent: Oct. 22, 1996

[54] RELEASABLE FASTENER ASSEMBLY

[75] Inventor: Gary Gordon, Southfield, Mich.

[73] Assignee: TRW Inc., Cleveland, Ohio

[21] Appl. No.: 382,484

[22] Filed: Feb. 1, 1995

[51] Int. Cl.⁶ .................................................. F16B 13/06
[52] U.S. Cl. ................ 411/48; 411/22; 411/60; 411/908
[58] Field of Search ............ 411/21, 22, 45–48, 411/60, 508, 510, 908

[56] References Cited

U.S. PATENT DOCUMENTS

| | | |
|---|---|---|
| 3,139,768 | 7/1964 | Biesecker . |
| 3,918,130 | 11/1975 | Poe . |
| 4,276,806 | 7/1981 | Morel . |
| 4,637,765 | 1/1987 | Omata . |
| 4,770,583 | 9/1988 | Lindberg . |
| 4,804,303 | 2/1989 | Statkus .................................... 411/48 |
| 4,840,523 | 6/1989 | Oshida .................................... 411/48 |
| 4,874,276 | 10/1989 | Iguchi . |
| 4,927,287 | 5/1990 | Ohkawa et al. . |
| 4,952,106 | 8/1990 | Kubogochi et al. . |
| 5,085,545 | 2/1992 | Takahashi . |
| 5,286,152 | 2/1994 | Anderson . |

FOREIGN PATENT DOCUMENTS 2520457  1/1982  France .

*Primary Examiner*—Flemming Saether
*Attorney, Agent, or Firm*—Fay, Sharpe, Beall Fagan, Minnich & McKee

[57] ABSTRACT

A fastener assembly adapted to be integrated with a component such as a coat hook to allow the coat hook to be releasably mounted to a panel. The fastener assembly includes resilient latch legs that extend from the first component and are adapted to engage in a panel opening. The legs include resilient spring fingers that permit the assembly to be preassembled to a second component such as a headliner prior to the time that the first component and the second component are joined to the panel.

11 Claims, 2 Drawing Sheets

RELEASABLE FASTENER ASSEMBLY

BACKGROUND OF THE INVENTION

The subject invention is directed toward the fastener art and more particularly, to a push-in type fastener that can be released and reused.

The invention is especially suited for incorporation in interior components to be installed in motor vehicles and will be described with reference thereto; however, the invention is capable of broader application and can be used for a variety of purposes in many environments.

Push-in, molded plastic fasteners are commonly used in the automotive industry for mounting various types of components to body panels and frame members. In commonly assigned U.S. patent application Ser. No. 08/270,463 filed Jul. 5, 1994 for "Visor Clip Assembly and Releasable Fastener," there is disclosed a fastener assembly that can be integrally incorporated into an associated component for providing releasable mounting of the component to a body panel. The preferred form of the fastener assembly comprises spaced resilient latch legs that extend from the component to be mounted. The legs can deflect toward one another to allow their positioning in a mounting opening in a body panel or frame. After the latch legs are in the panel, a rigid pin is inserted between the legs to maintain them locked in the mounting opening. Components such as sun visor clips, coat hooks, and assist straps or handles can be mounted using this type of fastener.

These types of components are generally mounted at locations wherein they overlie a layer of resilient headliner material. Thus, the locking legs extend through aligned openings in both the headliner and the body panel. As a consequence, installation of the headliner must be effected prior to installation of the associated components.

SUMMARY OF THE INVENTION

The subject invention provides a fastener assembly which facilitates installation of the headliner and the associated components by allowing the component and fastener to be preassembled into the headliner so that both the headliner and the component can be installed in the vehicle simultaneously as a unit. The design is such that the components can subsequently be released from their mounted position in the aligned panel and headliner openings without removing the headliner.

In accordance with a preferred aspect of the invention, there is provided a fastener assembly particularly intended for joining a first component to a panel. The assembly generally comprises a fastener body having a central opening extending therethrough and a pair of legs extending axially thereof on opposite sides of the central opening. The legs are adapted to be received in a hole in the panel and at least one of the legs is radially resilient and carries a latch portion for engagement with the panel to retain the fastener body in the panel opening. A pin member is mounted in the central opening for selective axial movement between an axially outer first position wherein said at least one resilient leg can deflect radially inward to allow removal of the fastener body from the panel and a second position axially inward of the first position wherein the at least one resilient leg is prevented from deflecting radially inward. Associated with one of the pin member and the fastener body to extend laterally of the pair of legs is at least one resilient finger arranged to permit the fastener assembly to be preassembled to the first component prior to joining the fastener body and the first component to the panel.

In its preferred form, the fastener body can be an integral part of a second component such as a coat hook, visor clip, assist strap, or the like.

Preferably, and in accordance with a more limited aspect of the invention, there are two of the resilient fingers which extend in laterally opposite directions and, additionally, there is a stop means to prevent inadvertent movement of the pin member from the first position to the second position.

In accordance with a further aspect of the invention, there is retaining means operable when the pin member is in the second position to retain the at least one resilient finger in an axial inward position to permit the pin member and the fastener body to be withdrawn from the hole in the panel.

The at least one resilient finger can be carried by the pin member or one or both of the pair of legs. Preferably, however, there are two of the resilient fingers carried by the pin member to extend laterally from between the pair of legs.

A primary object of the invention is the provision of a fastener assembly of the type described which allows preassembly of the fastener assembly to a first component prior to joining the fastener assembly and the first component to a second component such as a panel.

Yet another object of the invention is the provision of a fastener assembly of the push-in type wherein there are resilient fingers that allow preassembly of the fastener to a first component but which are moved to an inwardly retained position when the first component is connected to a second component to thereby permit selective removal of the fastener.

A still further object of the invention is the provision of a push-in type fastener which can be incorporated into the component being mounted as an integral part thereof.

Yet another object is the provision of a fastener assembly of the type described wherein a locking pin can be preassembled into the push-in fastener.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

Figure 1:
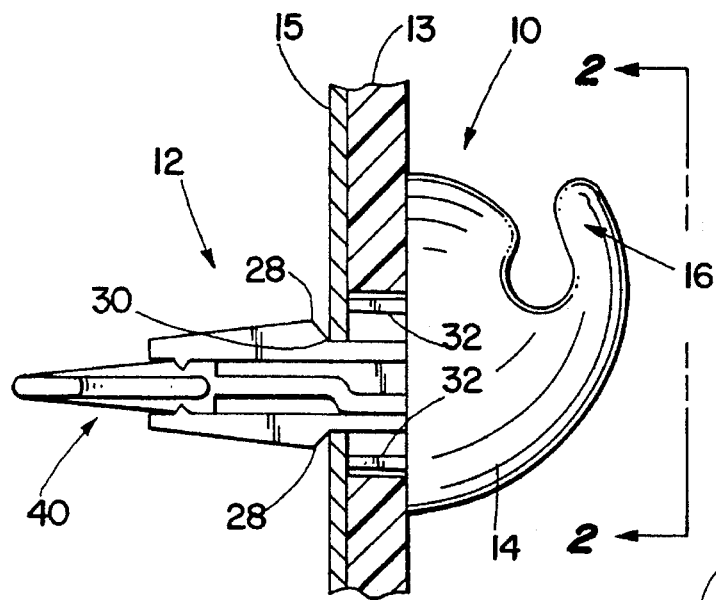
FIG. 1 is a side elevational view (partially in cross section) of a sun visor clip incorporating a push-in fastener assembly formed in accordance with the subject invention.
Figure 2:
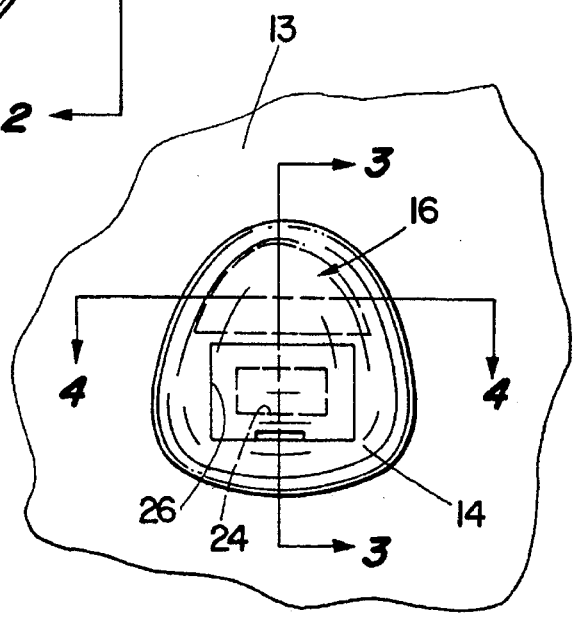
FIG. 2 is a right end view of the assembly shown in FIG. 1 (the view is taken on line 2—2 of FIG. 1)
Figure 3:
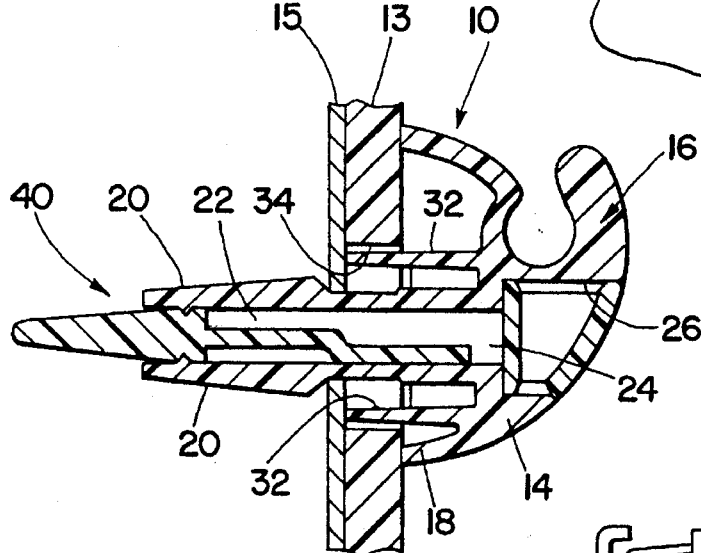
FIG. 3 is a cross-sectional view taken on line 3—3 of FIG. 2.

Referring now to the drawings wherein the showings are for the purposes of illustrating the preferred embodiment of the invention only and not for purposes of limiting same, FIG. 1 best shows the overall arrangement of a sun visor clip 10 which incorporates a push-in type fastener assembly 12 formed in accordance with a preferred embodiment of the subject invention. The visor clip and fastener assembly 12 are shown in conjunction with a headliner 13 mounted to a vehicle body panel 15. In the subject embodiment, the visor clip 10 and the associated fastener assembly 12 are formed as injection molded plastic components but they could, however, be formed from other materials or a combination of materials by other techniques. More particularly, referring to FIGS. 3 and 4, the visor clip component 10 is generally depicted as having a main body 14 terminating at its outer upper end in a hook portion 16 designed to resiliently receive and releasably hold the end of a vehicle visor support in a manner well known. The body 14 further defines a base 18 somewhat in the nature of a surrounding skirt.

Extending from the body 14 of component 10 are a pair of elongated leg members 20. Leg members 20 are, in the subject embodiment, molded integrally with main body 14 and are spaced apart to define an open center area 22 which is a continuation of a through opening or passage 24 from the outer end portion of clips component 10. A somewhat enlarged, rectangular entry end 26 is formed at the entrance to passage 24.

As can be seen in FIGS. 1 through 4, the legs 22 are radially resilient and deflectable toward one another. They further have a tapered outer end and each incorporates a latch portion 28. The latch portions 28 are sized and located so as to engage behind the edge of an opening 30 formed through the panel member 15. Note that the size of the opening 30 is such that the latch portions 28 engage behind the peripheral edge of the opening and act to hold the clip 10 in position. It should also be noted that suitable spacer legs 32 extend from the visor clip body to engage with the outer face surface of the panel 15 and locate the panel relative to the latch portions 28. In this regard, it should be noted that the relationship between the base 8 and the ends of the spacer legs 32 are determined by the thickness of the headliner 13. The pressure with which the base engages the headliner can, of course, be varied by varying the distance that the spacer legs 32 extend. In addition, it should be noted that the headliner 13 is preferably provided with an opening 34 that is somewhat larger than the opening 30 through panel 15. This allows the legs to engage the outer surface of the panel and thereby control the forces applied to the headliner and also act to stabilize the fastener assembly in the opening 30. Under many conditions, however, it would be possible to dispense with the spacer legs 34.

Figure 7:
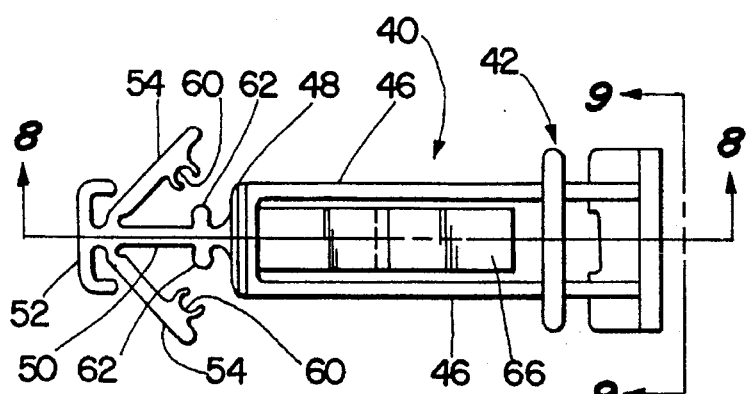
FIG. 7 is a plan view of the pin member used in the preferred embodiment.
Figure 9:
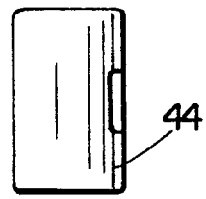
FIG. 9 is an end view of the pin member of FIG. 7 taken on line 9—9 of FIG. 7.
Figure 8:
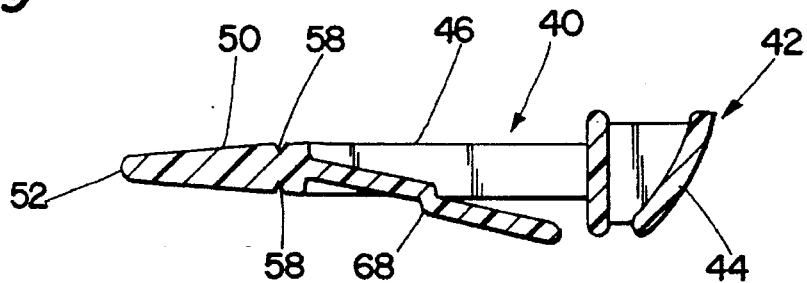
FIG. 8 is a cross-sectional view taken on line 8—8 of FIG. 7.

Extending into the space 22 between the legs 20 is an axially movable rigid pin member 40 which, when in the position shown in FIGS. 1 through 4, functions to prevent inward deflection of the legs and thus retains the legs in their outer position with their latch portions engaged behind the edge of opening 30. The pin member 40 could have a variety of different configurations and designs but is preferably shaped as best seen in FIGS. 7 through 9. As illustrated therein, the pin member 40 is molded from plastic and includes an outer head end 42 which is sized so as to be received within the enlarged outer end 26 of the passage 24 when the pin is in the fully inserted position of FIGS. 1 through 4. The head end 42 has an outer surface portion 44 contoured to provide a smooth continuation of the surface of the visor clip 10. Extending from the head end 42 are a pair of spaced, generally rectangular side members 46 that are joined at their inner ends by a connecting web 48. Extending from web 48 centrally thereof is a relatively narrow extension portion 50 that terminates in a rounded end 52.

The pin member 40 is, as previously mentioned, arranged to be received within the passage 24 to enter between the latch legs 20 and maintain them in their outward, biased position shown engaged with panel 15 in FIGS. 1 through 4. When the pin member is fully inserted, the head portion 42 is received within the large entry end 26 of passage 24 and the side members 46 and the transverse cross piece 48 are located at a position to hold the latch legs 20 in their latched position. To releasably maintain the pin 40 in this innermost position, there are provided suitable retaining means including retaining teeth 56 carried on the interior surfaces of legs 20 and adapted to engage into V-notches 58 formed on the cross piece 48 of pin member 40. The interengagement of the teeth 56 and the V-notches 58 act to retain the pin in its innermost located position to thereby hold the legs 20 in latched engagement. The pin can, however, be forced out against the noted engagement to an outer second position as shown in FIG. 5.

In the subject embodiment, means are provided to allow the fastener assembly 12 and clip 10 to be preassembled to the headliner 13. These means could take many forms but preferably comprise resilient spring fingers 54. The spring fingers could be carried on the legs 20 to extend laterally outwardly, but in the preferred form of the invention, are carried on the pin member 40 as shown in FIG. 7. In operation, the spring fingers 54 can engage outwardly of the opening in headliner 13 so as to maintain the fastener assembly 12 and the clip 10 in a preassembled position with the headliner 13. This preassembled relationship is shown in FIGS. 5 and 6.

Figure 4:
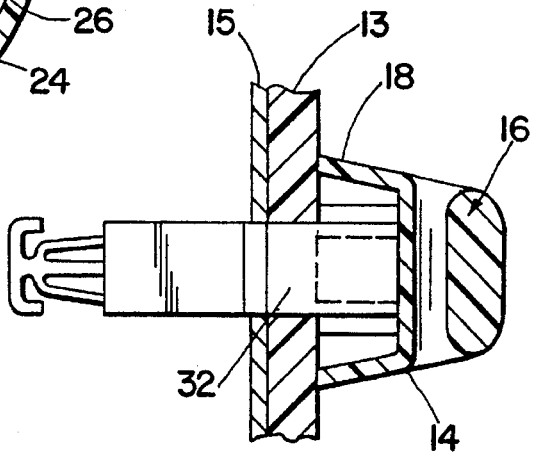
FIG. 4 is a cross-sectional view taken on line 4—4 of FIG. 2.
Figure 5:
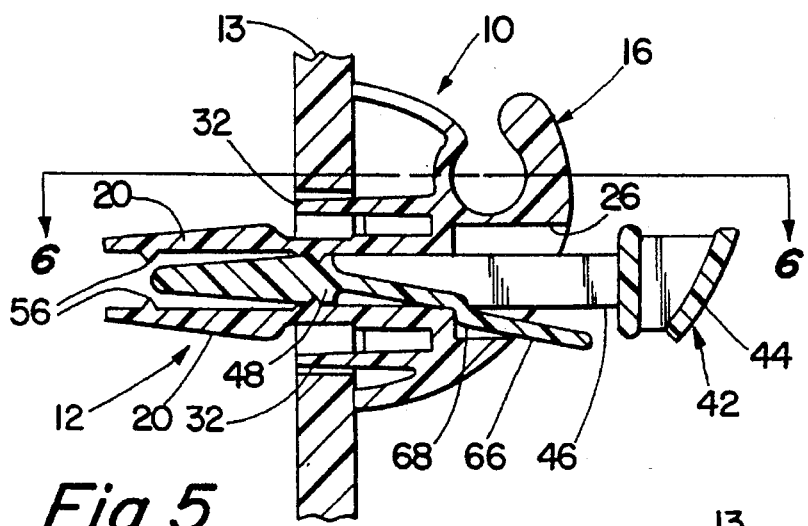
FIG. 5 is a view like FIG. 3 but showing the visor clip and fastener assembly preassembled to a vehicle headliner and prior to installation of the visor clip and headliner to a located and mounted position on the vehicle body panel.
Figure 6:
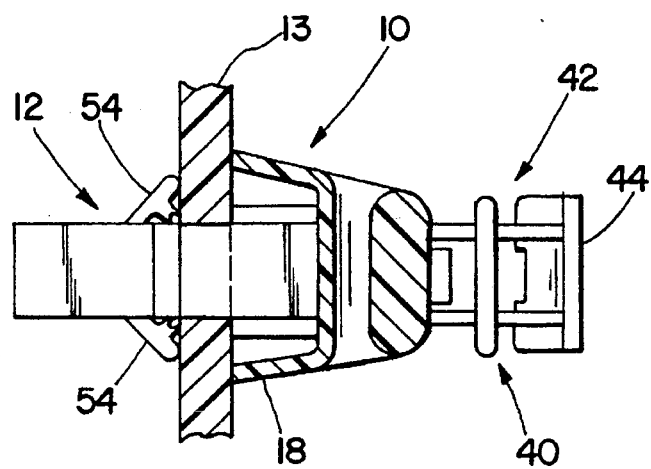
FIG. 6 is a cross-sectional view taken on line 6—6 of FIG. 5.

As can be seen from the FIGS. 5 and 6 showings, the entire visor clip and the associated fastener assembly can be joined to the headliner 13 to form a unitary subassembly for subsequent installation in the vehicle with the final assertion of the latch legs 20 through the opening 30 in the body panel 15. The latch pin can be preassembled to the condition shown in FIG. 5 and to put the spring fingers 54 in their proper engaged position. Subsequently, when the latch legs 20 are forced through the opening 30, the pin member 40 can subsequently be inserted to the final located position shown in FIGS. 1 through 4. In moving the pin member to the installed position of FIGS. 1 through 4, the finger 54 are compressed radially inward by the sides of the opening 30 in panel 15. To maintain the spring fingers 54 in the radially inward compressed position as shown in FIG. 4, there are provided latch elements 60 on the ends of the spring fingers 54. These latch elements 60 are engageable with corresponding ball-like elements 62 extending outwardly from the extension portion 50. Thus, when the spring fingers have been moved inwardly and engaged with the ball members 62, they are retained in that position and the pin then is held only by the teeth 56 and the V-grooves 58.

In the preassembled position of FIGS. 5 and 6, the subject embodiment provides means for preventing inadvertent inward movement of the pin 40. As best shown in FIGS. 5 through 9, a stop means in the form of a stop member 66 is located between the side members 46 of pin 40. The stop member 66 comprises a resilient lever formed to extend from the transverse piece 48. It has a normal, biased position as shown in FIGS. 5 and 8 with an intermediate latching or stop element 68 formed at the midpoint of the lever arm. As seen in FIG. 5, this stop portion 68 engages a shoulder at the juncture between the opening entrance end 24 and the opening 22. As can be seen from FIG. 5, with the lever 66 in the position shown, the pin 44 cannot be moved inward. However, by gripping the lever and moving it upwardly to align it with the main body of the pin, the engagement between the shoulder and the latch portion 68 is removed and the pin can be driven inwardly to its final latched position.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A fastener assembly for joining a first component to a panel comprising:

a fastener body having a central opening therethrough with a pair of legs extending therefrom on opposite sides of the central opening, said legs adapted for receipt in a hole in the panel, at least one of the legs being resilient radially of the central opening and carrying a latch portion for engagement with the panel to retain the fastener body joined to the panel;

a pin member in the central opening for selective axial movement between an axially outer first position wherein said at least one resilient leg can deflect radially inward to allow removal of the fastener body from the panel and a second position axially inward of the first position wherein the said at least one resilient leg is prevented from deflecting radially inward;

at least one resilient finger carried by one of the pin member and the fastener body to extend laterally of the pair of legs to permit the fastener assembly to be preassembled to the first component prior to joining the fastener assembly to the panel; and, selectively operable stop means for preventing inadvertent movement of the pin member from the first position to the second position, the stop means comprising a resilient lever carried by one of the main body and the pin.

2. The fastener assembly as defined in claim 1 wherein there are two resilient fingers extending in laterally opposite directions.

3. The fastener assembly as defined in claim 1 including catch means for releasably retaining the pin member in the second position.

4. The fastener assembly as defined in claim 5 wherein the lever has a free end that extends out of the central opening when the pin is in the first position.

5. The fastener assembly as defined in claim 4 wherein the lever is joined to the pin member.

6. The fastener assembly as defined in claim 1 wherein there is retaining means operable when the pin member is in the second position to retain the at least one resilient finger in a position to permit the pin and the fastener body to be withdrawn from the hole in the panel.

7. The fastener assembly as defined in claim 1 wherein the at least one resilient finger is carried by the pin member to extend laterally from between the pair of legs.

8. The fastener assembly as defined in claim 7 including retaining means operable when the pin member is moved to the second position for retaining the at least one resilient finger in a radially inward retracted position.

9. A fastener assembly for joining a first component to a second component and allowing the fastener assembly to be joined to the first component prior to joining the first component to the second component comprising:

a fastener body having a central opening extending axially therethrough from an outer first end to an inner second end;

a pair of resilient legs forming the second end of the main body and spaced from one another on opposite sides of the central opening, said legs being deflectable in directions toward and away from one another and capable of being received into openings in the first and second components;

latch portions on the legs adapted to engage the second component to retain the fastener body in the aligned openings;

a pin member in the central opening for selective axial movement between an outer first position and an inner second position, said pin member operable in the inner second position to prevent deflection of the legs in a direction toward one another and maintain the latch portions engaged with the second component;

resilient fingers carried on the pin member and adapted to extend laterally from between the pair of legs to permit the fastener assembly to be held in a preassembled position in the opening in the first component prior to inserting the fastener body into the opening in the second component; and, catch means on the pin member to engage with cooperating catch means on the resilient fingers to retain the fingers between the legs when the fastener assembly is inserted into the opening in the second component.

10. A fastener assembly as defined in claim 9 including manually operable stop means for preventing inadvertent movement of the pin member from the first to the second position.

11. A fastener assembly as defined in claim 10 wherein the stop means includes an actuating portion extending generally axially of the central opening and accessible from the first end of the central opening.

\* \* \* \* \*